United States Patent [19]
McLees

[11] 4,091,671
[45] May 30, 1978

[54] ELECTRONIC FLUID LEVEL SENSOR

[76] Inventor: Donald J. McLees, 2623 Virginia, Everett, Wash. 98201

[21] Appl. No.: 817,231

[22] Filed: Jul. 20, 1977

Related U.S. Application Data

[63] Continuation-in-part of Ser. No. 756,761, Jan. 5, 1977, abandoned.

[51] Int. Cl.² .............................................. G01F 23/10
[52] U.S. Cl. .................................. 73/313; 340/244 A; 331/65
[58] Field of Search ............... 73/313; 340/59, 244 A; 324/34 D, 34 PS; 331/65

[56] References Cited
U.S. PATENT DOCUMENTS

| | | | |
|---|---|---|---|
| 2,337,608 | 12/1943 | Hulsberg | 340/244 A |
| 2,804,517 | 8/1957 | Ferry | 340/244 A |

FOREIGN PATENT DOCUMENTS

| | | | |
|---|---|---|---|
| 820,993 | 8/1937 | France | 73/313 |

*Primary Examiner* — S. Clement Swisher

[57] ABSTRACT

A liquid level sensing device including a support element assuring predetermined placement of the sensing element within the fluid body. Secured to the support element are one or more small diameter coils of a conductive material having cage elements extending axially beyond the end of the coil in at least one direction and capturing a buoyant metallic sphere. When the sensor is in position, extending into a fluid body, the fluid level will dictate the position of the metallic sphere and the location of the sphere with respect to the coil will alter the coil characteristics. The altered coil characteristics initiate change in response in the interconnecting electronic circuit which may then be detected by a visual indicator or alternatively may serve as a switching pulse to remedy or alter or otherwise act upon the situation detected.

10 Claims, 8 Drawing Figures

FIG. 6
FIG. 7
FIG. 8
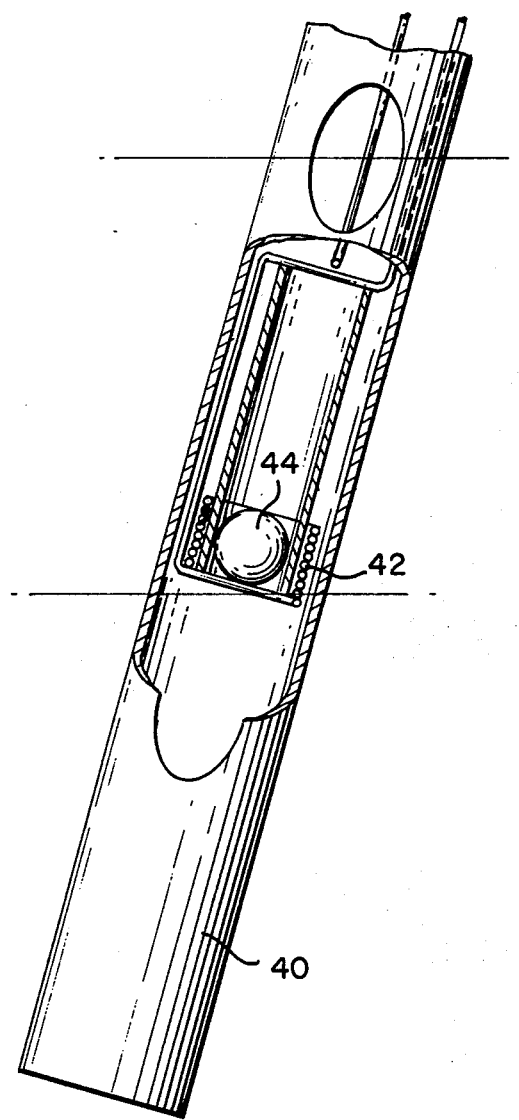
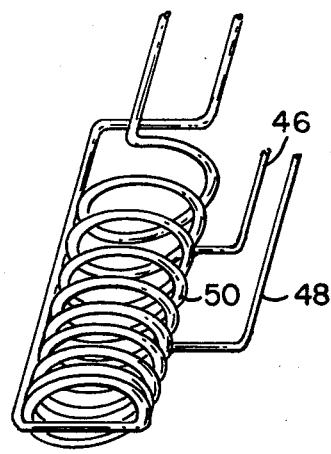
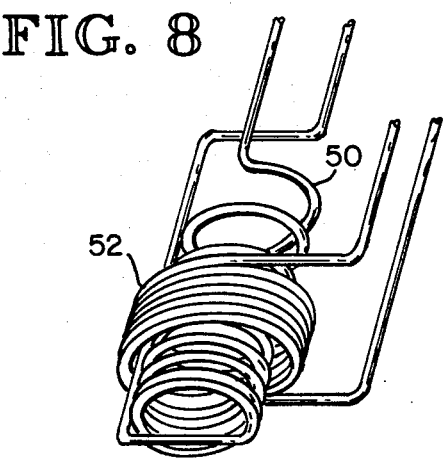

ELECTRONIC FLUID LEVEL SENSOR

This application is a continuation-in-part of application Ser. No. 756,761 filed Jan. 5, 1977 now abandoned.

BACKGROUND OF THE INVENTION

There are indeed many applications for use of a device such as an electronic probe fluid level sensor. Some of the more obvious applications include the measurement of the oil level within an internal combustion engine, a measurement of the fuel level for an engine or other fuel consumption device or the level of fluid in the bilges of an ocean going vessel or the like. The sensor could be used to determine the level of a critical fluid within a process thus assuring a predictable result.

The oil level within an internal combustion engine is usually determined by means of a dipstick or the like requiring the operator or attendant to have access to the engine, a requirement which is at best inconvenient and in some operations such as large construction vehicles, boats or the like virtually impossible without machine downtime.

Attempts have been made to automate the liquid level sensing and prior art noted in a novelty search illustrative of early attempts include U.S. Pat. No. 2,134,104 granted to Cressy on Oct. 25, 1938 which discloses a liquid level indicator including a float mechanically connected to a magnetic armature which moves within a reactance coil to proportionately reflect the location of the float ball and thus the liquid level within a closed tank.

U.S. Pat. No. 2,337,608 granted Hurlsberg on Dec. 28, 1943 discloses a liquid level sensing mechanism wherein mechanical means are utilized to move an inductive coil interconnected with an alternating current along the outside of an elongated float chamber in search of a mass of iron supported by a captured float. The iron alters the impedance of a coil and thus deflects the reading of a meter responsive to the alternating current. Such an apparatus by both its principal of operation and its physical configuration is limited in application to structures or installations where there is ample space and cannot be used in conjunction with a small diameter probe.

U.S. Pat. No. 2,804,517 granted Aug. 27, 1957 to Ferry indicates an oil level indicator incorporated in a probe type mechanism. The reference includes the utilization of a float having a conductive surface such that when the fluid level reaches a critical stage the conductive float will complete the circuit between the conductive tubular containment device and ground thus lighting an indicator lamp.

U.S. Pat. No. 2,853,878 granted to Anderson et al on Sept. 30, 1958 discloses yet another electronic means for measuring fluid. A float of magnetic material is used in conjunction with a series of vertically placed and spaced magnetometers to detect the position of a float in a step-by-step manner. Because of the generation of a magnetic flux field, this device necessarily requires a substantial amount of space for the detecting device as well as an AC current for the energization or generation of the flux.

U.S. Pat. No. 3,389,603 granted to Jacobs III on June 25, 1968 includes a float device having a magnetic element embedded therein. The magnet is of a sufficient strength to energize a reed switch secured adjacent the sight glass containing the magnet thus giving an indication of the liquid level.

U.S. Pat. No. 3,820,396 granted to Gamer et al on June 28, 1974 discloses a fluid level indicator wherein a buoyant movable element is placed within a transparent guide tube. The indicator sets up an RF or high potential field inside the tube which causes a gas captured within the movable element to glow when the element is within the field, thus giving a visual indication of the liquid level.

U.S. Pat. No. 3,895,235 granted to Melone on July 15, 1975 discloses a liquid level and specific gravity indicator wherein a light beam is transmitted downwardly through the fluid and reflected back through another path. If the liquid is below a certain level, a floating ball acts as a shutter to block light between the prisms, interrupting the beam and thus indicating the level within the container.

U.S. Pat. No. 3,968,687 granted to Fester on July 13, 1976 discloses a device for indicating a specific gravity and/or level of an electrolyte within a wet storage battery. The device includes a magnetically actuated switch secured to the battery and a floatation device which responds both to the level of the electrolyte and the specific gravity of electrolyte. The floatation device actuates the switch if either the level or the specific gravity of the fluid drops below a predetermined level.

French Pat. No. 820,993 granted to Pautou on July 28, 1936 discloses a liquid level sensing mechanism in which the impedance of an alternating current coil with variably spaced windings encased in a cylindrical chamber is altered by the presence of a soft iron float. It would appear from the circuit and the elements involved in the circuit that it would take a fairly large mass of metal to alter the position of the needle thus restricting this structure to installations of fairly large size.

As can readily be seen, the prior art, while addressing the problem of electronically sensing the fluid level within a closed or remote container, does not address the problem of sensing same with a device which is readily adaptable to varying environments and needs. The advantages of a probe like device are many fold. For example, a standard automobile engine including a dipstick for determining the oil level could easily incorporate an electronic probe in accordance with the present invention without any restructuring of the engine. In engines yet to be built, an electronic probe could be incorporated as a part of the engine and will more accurately reflect engine conditions than is presently possible without occupying a great deal of space within the engine and thus necessitating redesign.

Another advantage of the electronic probe as hereinafter disclosed lies in the fact that it is essentially unaffected by a hostile environment and can withstand both high temperatures and corrosive fluids.

A further advantage of the present mechanism, when electrically interconnected to a warning light or other such system, is that it will generate a negative response, i.e., indicate insufficient fluid or a condition needing attention in the case of any malfunction of the probe or the interconnecting electronics.

Still a further advantage of the present invention lies in the fact that the probe and the circuitry necessary to activate a display or the like, are extremely compact and light in weight. The compactness makes the device easily usable within the space available within a vehicle, within its engine or the operator's station. The low weight is an advantage for aircraft applications.

Yet another distinct advantage of the present invention lies in the fact that the inventive sensing device is extremely accurate and further since the sensing circuit is in a balanced condition, a slight change in the efficiency of the coil due to the introduction of the float immediately causes a significant change in amplitude of the oscillator signal.

With the above noted advantages in mind, it is an object of the present invention to provide an electronic probe type fluid sensor wherein the sensor is extremely compact and capable of being inserted into the bore or opening normally utilized for a fluid indicating dipstick in vehicles.

It is another object of the present invention to provide an electronic fluid level probe wherein the construction and circuitry is such that any malfunction whether it be liquid below a certain level or a short in the circuit would initiate an "attention required" signal.

It is still a further object of the present invention to provide a fluid level sensor which in its preferred embodiment is designed for use in automobiles wherein a fluid level indicating dipstick is replaced by a hollow probe having mounted therein a sensing mechanism electrically interconnected with a warning light or other indicator on the dash indicating a condition requiring attention.

Still a further object of the present invention is to provide an electronic probe requiring very little space and one wherein the level of the fluid is indicated by utilization of a small buoyant object which is captured and restricted to a path of movement axially of a wound coil of small diameter. The object moves into or out of the coil depending upon the fluid depth.

Yet another object of the present invention is to provide a liquid level indicator which is directly responsive to the level since the level is reflected by a metallic buoyant ball captured and restricted in path of movement to assure detection.

Still a further object of the present invention is to provide an electronic probe fluid level detector which may be used in conjunction with other detectors thereby yielding a step-by-step level indication.

Yet a further object of the present invention is to provide a fluid detection device utilizing a coil as an integral part of an oscillator circuit wherein portions of the coil may be used as inputs for a second or tertiary oscillating circuit thereby rendering the primary coil self-calibrating.

Another object of the present invention is to provide a main coil having a float mounted therein for detection of fluid level and having a secondary or tertiary coil coaxial with the main coil and serving as the input for a second oscillator circuit such that the float passing through the coaxial coils can, in fact, give two separate and distinct outputs simultaneously.

BRIEF DESCRIPTION OF THE DRAWINGS

FIG. 6 is a view similar to FIG. 3 wherein the diameter of the float is essentially equal to the length of the coil rendering the coil extremely accurate.

FIG. 7 is a view similar to that of FIG. 5 wherein the level indication would be an analogue of the liquid level within the parameters of the detection system and further including a secondary detection system using the coils of the main analogue device.

FIG. 8 is a view similar to FIG. 7 utilizing a secondary coaxial coil to serve as the means for caliberating the main analogue coil.

DETAILED DESCRIPTION OF THE DRAWINGS

Figures 1, 2:
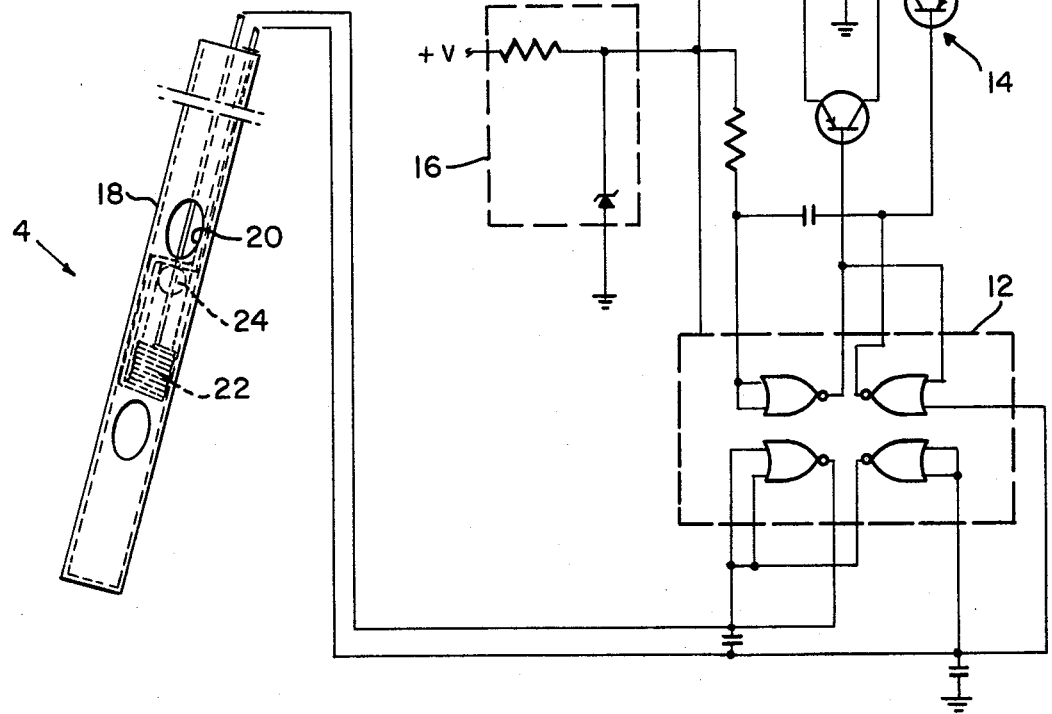
FIG. 1 is an environmental view showing the inventive electronic probe in one application.
FIG. 2 is an elevational view of one type of probe in a typical usage situation including an electric schematic.

As seen in FIG. 1, the present invention is adapted for use in a standard passenger automobile shown in outline as 2 or other mechanism utilizing an internal combustion engine. The fluid sensor probe generally designated as 4 would be inserted into the engine block 6 in place of the standard liquid level indicating dipstick and the interconnecting wiring connects to the detection circuitry 8 and then to an indicator panel 10 within the passenger compartment. In this preferred embodiment, a signal light, selectively actuated by the operator, is envisioned. As will be explained hereinafter, the driver selectively has a visual indication of the fluid level within the engine enabling him, without leaving the passenger compartment, to determine the need for the addition of oil or the like. Further, as described hereinafter, the coil could be altered to give an analogue readout.

Referring now to FIG. 2, there is shown a cross-sectional view of the preferred embodiment of one form of the sensing element generally designated as 4 as well as a schematic of a typical circuit for use with a single sensing unit. It is to be understood that the circuitry could be easily adapted for use with a multiple coil sensing unit thereby giving the operator a step-by-step indication of the level, each reading generated by the same probe. As seen in this view, the main element of the circuitry is a four norgate chip generally designated as 12, two gates of which serve to create a resonant oscillator of which the sensing coil is the inductive element. The remaining two gates serve to create the detector portion of the circuit, the detector portion being responsive to the significant change in amplitude of the oscillator signal due to the introduction within the sensing coil of the float. Also seen in this view if the indicator section designated generally as 14 which in the preferred embodiment would include a pair of light emitting diodes 15 which would indicate the relative fluid level. Since the illustrative unit is primarily designed for use in vehicles, an electrical system which is subject to surges, the circuit protection generally designated as 16 is indicated in the schematic.

Referring now in particular to the probe itself, it can be seen that it is a thin rigid elongated tubular element 18 having a plurality of ports 20 for constant communication with the surrounding environment and for drainage of the fluid as the level changes. The probe includes a compact coil 22 containing a metallic buoyant ball 24 all of which will be described in greater detail with respect to FIGS. 3 through 8.

Figure 3:
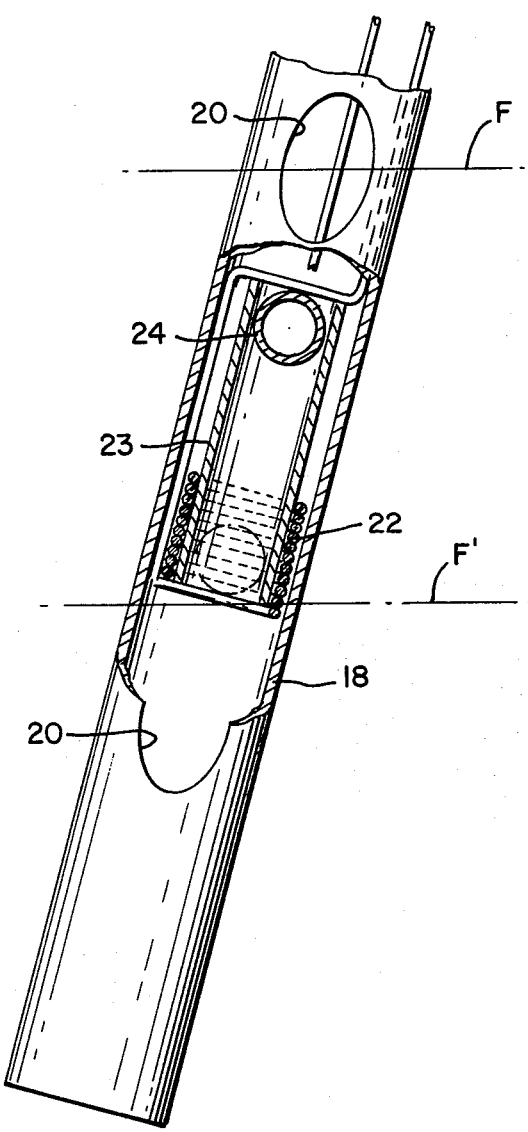
FIG. 3 is an enlarged portion of FIG. 2 detailing the actual sensor portion of the probe.

As seen in FIG. 3, the primary element or sensor portion of the apparatus includes a rigid elongated hollow tube 18 which can be of any appropriate length for convenience and of any material capable of withstanding the particular environment. In the preferred embodiment wherein the sensor is used for ascertaining the oil level within the crankcase of an engine, the tube is preferably of a size that would fit into the present opening for the standard oil dipstick and of a length to reach the desired oil level. The tube itself includes a plurality of vents or openings 20 to avoid a pressure differential between the interior and exterior of the tube as well as providing drainage holes to assure relatively consistent levels within and without the probe.

As will be explained hereinafter, the sensing device is structured such that in adverse environments the metallic float, the coil or any other parts may easily be enclosed in a substance uneffected by the liquid to be measured.

Figure 4:
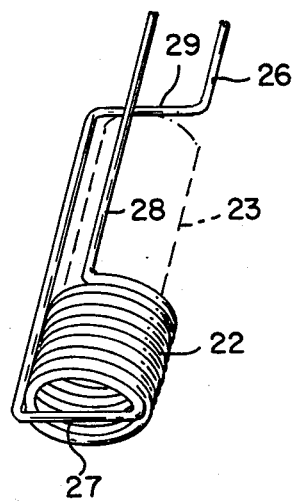
FIG. 4 is a view of one possible coil and cage configuration, referred to as a digital coil.
Figure 5:
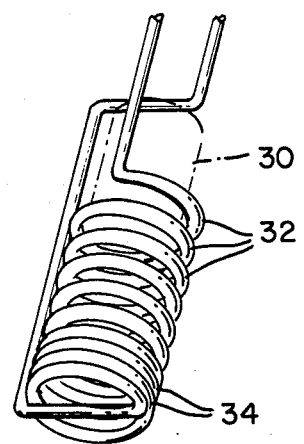
FIG. 5 is a view of another possible cage configuration wherein the level indication would be an analogue of the liquid level within the parameters of the detection system.

Mounted within the tube 18 is an electrical coil generally designated as 22 which in the preferred embodiment is wrapped around a cylindrical coil form 23. It is desirable that the coil length be comparable to or less than the diameter of the metallic float, for optimum accuracy. While the number of turns of the coil can vary, depending on the specifics of the detection circuitry, it is important that the turns be sufficient in number to allow a certain critical circuit state to be attained. The movement into the coil of the buoyant metallic sphere 24 upsets that critical state and thus allows detection, which can in turn be used to indicate a particular condition, i.e., liquid level, or alternatively start a pump or the like to alter or act upon the sensed condition. As seen in this view, and more particularly shown in FIGS. 4 and 5, is that the coil 22 and its leads 26, 28 may serve as portions of a cage for the buoyant structure thus reducing the total number of necessary parts. At the bottom of the coil 22 one portion of the lead 26, designated as 27, extends diametrically across the bottom of the coil 22 thereby preventing a captured ball from moving downwardly beyond the bottom of the coil. The lead then extends upwardly alongside the coil form and extends diametrically across the top of the coil at 29 forming a top of the cage. Thus the leads, in cooperation with the coil form 23 capture the buoyant element limiting it to axial movement with respect to the coil before extending upwardly for proper connnection to the detection circuit. It should be noted that in this configuration, referred to as the digital configuration, the concept is substantially different from any of the prior art. The configuration allows a number of coil/sphere combinations, or sensing units, to be stacked in a single probe. Since the lower cage portion retains the sphere in the coil when the level drops, all sensing units above the level are "off" while those below the level are "on", thus providing a means of controlling a stack of visual indicators that reflect the fluid level. Perhaps even more significant is the fact that since the float ball is very small and since the coil is in length comparable to or even less than the diameter of the ball, an individual sensing unit is necessarily very accurate. Since detection does not occur until after the ball has begun to enter the coil, the device necessarily cannot be inaccurate by any more than one ball diameter. In actuality, the circuit can be set up such that the accuracy is within a small fraction of a ball diameter.

The buoyant element although shown as spherical, is not necessarily of that configuration. It is critical, however, that the buoyant element be of such a size that the fluid being measured can freely flow between the interior of the coil form and the buoyant element. If the buoyant element is such that it will form a seal with the interior of the coil form there is probability that as the fluid level drops beneath the coil form, air will enter beneath the buoyant element and upon the upward thrust of the additional fluid may be captured, forming a bubble beneath the buoyant element and thus inaccurate detection.

As will be apparent when the fluid level, designated generally as F in FIG. 3, falls to a point such as F', the ball 24 will fall to a position as shown in phantom and be detected by the circuitry. The detection method relies on a balance of the coil characteristics, resonant frequency, circuitry component characteristics, and float material such that the combination when not influenced by the float is near the point of circuit operation wherein a slight change in coil efficiency drastically affects the oscillator's wave shape, the float being of such a material that its presence within the coil effects such a change. It should be noted that herein lies a critical departure from prior art detection means. Whereas devices of the prior art require a relatively massive soft iron float to affect the impedance of a coil in an alternating current circuit, the employment of solid state circuitry in conjunction with principles of coil efficiency in a resonant oscillator allow the presence of a very small amount of metal, not necessarily ferrous, to drastically affect circuit behavior. Such a detection method is conducive to the small probe concept. In addition it allows the float to be of a material other than soft iron, a significant factor in the fabrication of such a small float. For example, whereas it may be exceedingly difficult to make a small hollow sphere of iron, it is relatively easy to fabricate such a sphere from commonly available aluminum foil. The foil can be wrapped around a solid core ball of a dissolvable material. A solvent which seeps through overlaps of the foil can dissolve away the core leaving, after the application of heat to vaporize and expel the solvent, a hollow aluminum float ball which can then be sealed with the appropriate sealer.

It is important that the probe be relatively maintenance free since it will be in use in extremely adverse conditions. It has been found that the utilization of the inventive sensing probe within the crankcase of an engine wherein the ball has a tendency to fluctuate up and down, since the fluid level in the automobile is in motion, serves to keep the apparatus relatively clean. As will be readily apparent, although not shown in the drawings, the fluid level within the sensor probe itself will be slightly different from the fluid level immediately outside because of surface tension and the like. These various factors can be taken into consideration when the probe is manufactured and installed thereby eliminating this as a source of major error.

Referring now in particular to FIG. 5, an alternative embodiment of the coil may be seen. As seen in this view, the coil leads again serve as a portion of the cage and the coil is wrapped around coil form 30. It is to be noted, however, that the coil itself includes spaced coil loops 32 at the upper portion of the coil and contiguous loops 34 at the bottom. The utilization of loops of differential spacing allows the indication of level of liquid to be in analogue form instead of step form. It is further contemplated that to accommodate measurements over a large variation the coils could be stacked and the amplitudes stacked.

Referring now to FIG. 6, the digital sensing device, mounted in a probe 40 may readily be seen. The sensing device includes the cage and leads as explained hereinabove but it should be noted that the length of the coil 42 is approximately equal to or slightly less than the diameter of the float 44. As explained hereinabove, the relative size of the coil and float renders the sensing device extremely accurate.

FIGS. 7 and 8 depict analogue type sensors including means to render them self calibrating. In FIG. 7, a pair of leads 46, 48 are secured intermediate the ends of analogue coil 50 and are interconnected with a sensing circuit rendering the portion of the main analogue coil a small digital sensor. Obviously, many pairs of leads and taps could be combined. In FIG. 8 a self-calibrating structure is formed by utilization of a coaxial digital coil 52 surrounding the analogue coil 54.

As can be seen, the electronic fluid level sensor as described hereinabove is simple, relatively error free, can be manufactured at low cost and can be used under extremely adverse conditions without significantly altering the reliability. Because of the compact size and reliability, the present invention is a significant improvement over the present state of the art. Further, although shown as utilized in an automobile crankcase, the probe could equally well be used in a bilge to actuate a pump, within a process to cause shutdown in the event of a low liquid level or in many other environments.

What is claimed is:

1. A fluid level sensor comprising:
   a small diameter solenoid type induction coil having substantially contiguous windings and of a length comparable to the maximum dimension of a buoyant metallic means, captured for movement substantially axially with respect to the coil from a point intermediate the ends of the coil to a point exterior of the coil,
   a solid state oscillator utilizing the coil is an inductive component,
   detection circuitry responsive to the oscillator to determine if the buoyant metallic means is inside or outside the coil, and
   means responsive to the output signal of the circuitry for performing a predetermined function.

2. An electronic probe for sensing a fluid level comprising:
   a removable rigid elongated means mounted to extend from a point above the desired liquid level to a point below the desired liquid level,
   coil means secured to the rigid elongated means at approximately the desired liquid level,
   cage means secured to the rigid elongated means and extending axially beyond the coil means in an upward direction, said cage means including side portions and end portions permitting the passage of fluid,
   buoyant means captured within the cage means for movement with the liquid level axially of the coil means from a position within the confines of the coil to a position outside the confines of the coil,
   circuit means interconnected with the coil means to detect whether the buoyant means is within the coil means, and
   means responsive to the detection.

3. A fluid level sensor comprising:
   a small diameter elongated solenoid type induction coil having variably spaced windings,
   buoyant metallic means captured for movement substantially axially with respect to the coil from one end of the coil to the other,
   a solid state oscillator of which the coil is an inductive component,
   said oscillator and related components, the metal of said buoyant metallic means, and the operating frequency of the oscillator all specifically chosen such that the oscillator signal is very sensitive to a change in coil efficiency caused by a change in position of the bouyant metallic means,
   detection circuitry for converting the change in oscillator signal to a change in output, and
   means responsive to the output of the circuitry whereby the output may indicate or act upon the sensed level.

4. A liquid level sensor capable of both continuous and intermittent indications of the fluid level comprising;
   a primary small diameter elongated solenoid induction coil having variably spaced windings,
   buoyant metallic means captured for movement substantially axially of said coil,
   a solid state oscillator of which the coil is an inductive component,
   said oscillator and related components, the metal of said buoyant metallic means, and the operating frequency of the oscillator all specifically chosen such that the oscillator signal is very sensitive to a change in coil efficiency caused by a change in position of the buoyant metallic means,
   detection circuitry for converting the change in oscillator signal to a change in output,
   secondary coil means interconnected with and serving as an inductive component for an oscillator responsive to the presence of the buoyant metallic means whereby the secondary coil may serve as a backup for the primary coil, and
   means responsive to the output.

5. A sensor as in claim 4, wherein the secondary coil is in integral part of the primary coil.

6. A sensor as in claim 4 wherein the secondary coil is coaxial and separate from the primary coil.

7. An electronic probe for sensing fluid level capable of both continuous and intermittent indications of the fluid level comprising:
   a rigid elongated means mounted to extend from a point above the surface of the liquid to a point below the surface,
   a primary small diameter elongated solenoid type induction coil having variably spaced windings, said induction coil being secured to the rigid elongated means,
   buoyant metallic means captured for movement substantially axially of said coil,
   a solid state oscillator of which the coil is an inductive component,
   said oscillator and related components, the metal of said buoyant metallic means, and the operating frequency of the oscillator all specifically chosen such that the oscillator signal is very sensitive to a change in coil efficiency caused by a change in position of the buoyant metallic means,
   detection circuitry for converting the change in oscillator signal to a change in output, secondary coil means secured to the rigid elongated means, said coil means being interconnected with and serving as an inductive component for an oscillator responsive to the presence of the buoyant metallic means whereby the secondary coil may serve as a backup for the primary coil, and means responsive to the output.

8. A probe as in claim 7 wherein the secondary coil is an integral part of the primary coil.

9. A probe as in claim 7, wherein the secondary coil is coaxial and separate from the primary coil.

10. An electronic probe for sensing fluid level comprising:
- a rigid elongated means mounted to extend from a point above the surface of the liquid to a point below the surface,
- a small diameter elongated solenoid type induction coil having variably spaced windings, said induction coil being secured to the rigid elongated means,
- buoyant metallic means captured for movement substantially axially of said coil,
- a solid state oscillator of which the coil is an inductive component,
- said oscillator and related components, the metal of said buoyant metallic means, and the operating frequency of the oscillator all specifically chosen such that the oscillator signal is very sensitive to a change in coil efficiency caused by a change in position of the buoyant metallic means,
- detection circuitry for converting the change in oscillator signal to a change in output and
- means responsive to the output.

* * * * *